US008965626B2

(12) United States Patent
Kesavan et al.

(10) Patent No.: US 8,965,626 B2
(45) Date of Patent: Feb. 24, 2015

(54) EVENT DATA RECORDING FOR VEHICLES

(75) Inventors: Vijay Sarathi Kesavan, Hillsboro, OR (US); Ranjit S. Narjala, Portland, OR (US); Xiangang Guo, Portland, OR (US); Victor B. Lortz, Beaverton, OR (US); Anand P. Rangarajan, Beaverton, OR (US); Somya Rathi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/992,720

(22) PCT Filed: Dec. 30, 2011

(86) PCT No.: PCT/US2011/068014
§ 371 (c)(1),
(2), (4) Date: Jun. 8, 2013

(87) PCT Pub. No.: WO2013/101145
PCT Pub. Date: Jul. 4, 2013

(65) Prior Publication Data
US 2014/0058583 A1   Feb. 27, 2014

(51) Int. Cl.
G01M 17/00    (2006.01)
G06F 7/00     (2006.01)
B62D 41/00    (2006.01)
G01D 9/00     (2006.01)

(52) U.S. Cl.
CPC  *G06F 7/00* (2013.01); *B62D 41/00* (2013.01); *G01D 9/005* (2013.01)
USPC ........................................ 701/31.3

(58) Field of Classification Search
None
See application file for complete search history.

(56) References Cited

U.S. PATENT DOCUMENTS

| 6,076,026 | A | 6/2000 | Jambhekar | |
|---|---|---|---|---|
| 6,311,240 | B1 * | 10/2001 | Boone et al. | 710/74 |
| 7,804,426 | B2 | 9/2010 | Etcheson | |
| 7,933,412 | B2 | 4/2011 | Kugumiya | |
| 8,004,558 | B2 * | 8/2011 | Prechtl et al. | 348/48 |
| 2006/0156036 | A1 * | 7/2006 | Oh et al. | 713/193 |
| 2007/0233977 | A1 * | 10/2007 | Kaneko | 711/154 |
| 2008/0148374 | A1 | 6/2008 | Spaur | |
| 2009/0273672 | A1 * | 11/2009 | Koudritski | 348/148 |
| 2009/0295905 | A1 * | 12/2009 | Civanlar et al. | 348/14.09 |
| 2010/0222958 | A1 * | 9/2010 | Kobayashi et al. | 701/29 |
| 2012/0146834 | A1 * | 6/2012 | Karr | 342/47 |
| 2012/0331550 | A1 * | 12/2012 | Raj et al. | 726/22 |

OTHER PUBLICATIONS

PCT International Search Report and Written Opinion issued in corresponding PCT/US2011/068014 dated Sep. 21, 2012 (12 pages).

* cited by examiner

*Primary Examiner* — Thomas Tarcza
*Assistant Examiner* — Adam Alharbi
(74) *Attorney, Agent, or Firm* — Trop, Pruner & Hu, P.C.

(57) ABSTRACT

In accordance with some embodiments, in response to the detection of a particular event, an event data recorder may enter a secure mode. In the secure mode, data from various peripherals is collected over a secure channel and stored in a secure memory within the event data recorder. That data may subsequently be read out under secure conditions with an assurance of reliability while the system is in a secure mode, it may continue to collect data in a non-secure mode in parallel.

24 Claims, 4 Drawing Sheets

EVENT DATA RECORDING FOR VEHICLES

BACKGROUND

This relates generally to event data recorders and particularly to event data recorders for vehicles.

Event data recorders are well known on airplanes. Typically the event data recorders are called black boxes and are used by accident investigators to determine the cause of airplane accidents. It has also been contemplated that event data recorders may be included in motor vehicles. One aim of these event data recorders may be very similar to those in airplanes, namely crash analysis.

The National Highway Transport Safety Administration has mandated that all light vehicles in the United States manufactured after Sep. 1, 2012 include an event data recorder that records a minimum set of data elements. The electronic data recorders typically store data for a few seconds prior and after unusual events in the car electronic systems.

Current event data recorders under development are proprietary, closed systems often implemented by a system-on-a-chip which records a limited data set coming from the control area network bus of the vehicle. Retrieving data from event data recorders is a cumbersome process, that requires trained professionals connecting proprietary equipment to read out the data.

DETAILED DESCRIPTION

In accordance with some embodiments, in response to the detection of a particular event, an event data recorder may enter a secure mode. In the secure mode, data from various peripherals is collected over a secure channel and stored in a secure memory within the event data recorder. That data may subsequently be read out under secure conditions with an assurance of reliability. While the system is in a secure mode, it may continue to collect data in a non-secure mode in parallel.

Figure 1:
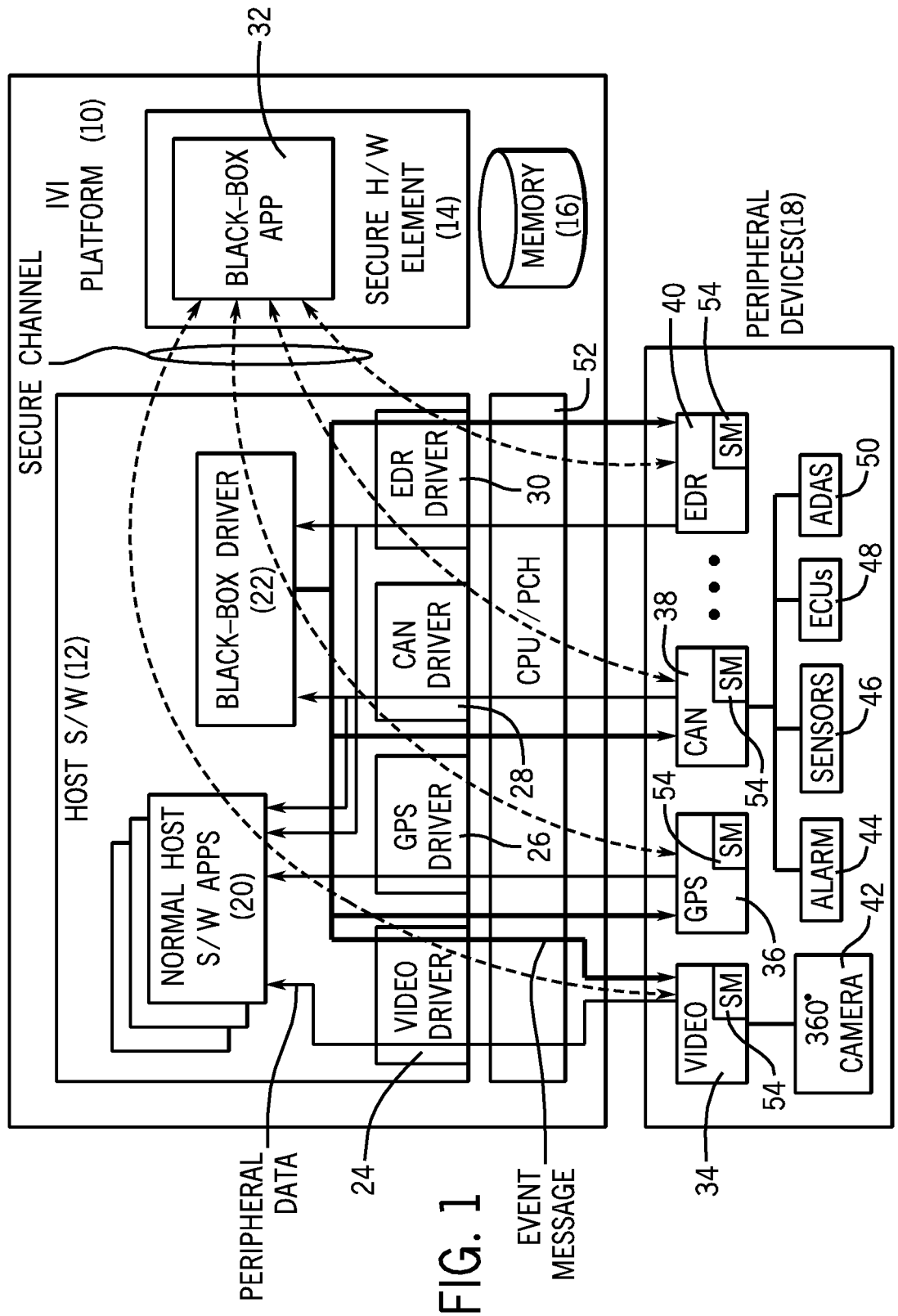
FIG. 1 is a system depiction for one embodiment to the present invention.

Referring to FIG. 1, an in-vehicle infotainment (IVI) platform 10 is depicted. While in some embodiments, the present invention may be implemented as part of an in-vehicle infotainment system, in other embodiments, it may be implemented as a dedicated electronic data recorder or may be integrated into existing automotive microcontrollers.

Microcontrollers in electronic control units in existing vehicles communicate with each other through a controller area network (CAN) bus. All messages pertaining to the vehicle, such as door status, engine, and alarm status are carried by this bus. In-vehicle infotainment platforms connect to the CAN bus through a CAN interface. A CAN driver decodes the data from the CAN bus and provides it to a host central processing unit.

In FIG. 1, the in-vehicle infotainment platform 10 includes host software 12 and a central processing unit (CPU)/peripheral component hub (PCH) 52. Also contained within the platform 10 is a secure hardware element 14. A memory 16 may be accessible by the central processing unit/peripheral component hub 52 in some embodiments. Of course other architectures are also contemplated. In some embodiments, an open system is implemented that can be accessed without proprietary tools.

The host software 12 may include a variety of host software applications 20, a black box driver 22, a video driver 24, a global positioning system driver 26, a CAN driver 28 and an event data recorder driver 30. Each of the drivers 24 through 30 receives messages from the driver 22 and sends those messages to peripheral devices such as the video peripheral device 34, the global positioning system (GPS) peripheral device 36, the CAN peripheral device 38 and the event data recorder 40. Each of the peripheral devices may include a memory 54. In some embodiments, a memory may be a circular buffer that gets periodically rewritten so that it only records information for a predetermined amount of time before it is refreshed.

In some embodiments data collection may be triggered by an event. For example alarm 44 may issue an alarm in response to an unusual situation and in response, data may be collected. For example when a sudden acceleration is sensed, data collection may be triggered.

Thus in some embodiments, the provision of the buffer 54 allows automatic provision of data collected during a predetermined amount of time before the triggering event. In addition data after the event may be automatically collected. Thus in some embodiments, the amount of pre-event data may be determined by the size of the buffer and the amount of post-event data, that is provided may be determined by programmed time limitations.

Each of the peripheral devices 18 may be connected to an actual peripheral such as a camera 42, an alarm 44, sensors 46, an electronic control unit 48 or an advanced driver assistance system (ADAS) 50. The GPS device 36 may be its own sensor.

Within the secure hardware element 14 may be black box application software 32 executed by the secure hardware element 14. Generally the secure hardware element 14 may be a secure microcontroller or a secure processor that is independent from the platform 10 processor. For example, it may be an manageability processor or a processor for executing a secure environment. Such processors limit access to only certain applications and generally do not permit access by host software applications 20. This provides a secure environment which is less amenable to attack by outside software based attackers.

While the peripheral devices are generally shown as being connected to the IVI platform 10, they may also connect through the CAN bus 38.

Data from the CAN bus 38 and the other peripherals 18 is decoded by a corresponding driver in the platform 10. Thus video is decoded by the video driver 24, GPS sensor data is decoded by the GPS driver 26, CAN data is decoded by the CAN driver 28 and event data recorder data is decoded by the event data recorder driver 30. After decoding, the data is then made available to the host application's 20 as indicated by the arrows labeled peripheral data.

The platform 10 may perform a black box or electronic data recorder functionality with secure and tamper resistant collection and storage of data from peripherals. This functionality may advantageously be performed in a hardware layer such as the secure hardware element 14 in some embodiments, since software components may be exposed to security threats like hacking, malware, and other compromises.

Each of the peripheral devices 18 from which data is collected may have two modes of operation including a normal and a secure mode. The normal mode is a regular operation of the peripheral device where it sends data to the host. In the secure mode, the peripheral device continues sending data, in the normal mode, but additionally signs another copy of the data and sends it to the host through a secure channel, labeled "secure channel" in FIG. 1.

The peripheral devices 18 have additional memory or buffer 54 to store data. The secure memory 54 can be a circular buffer which gets rewritten. The secure memory retrieved data prior to any unusual events and for some period afterwards. The amount of memory needed depends on the data that is generated by a particular peripheral device and the amount of history data that may be desirable.

Figure 2:
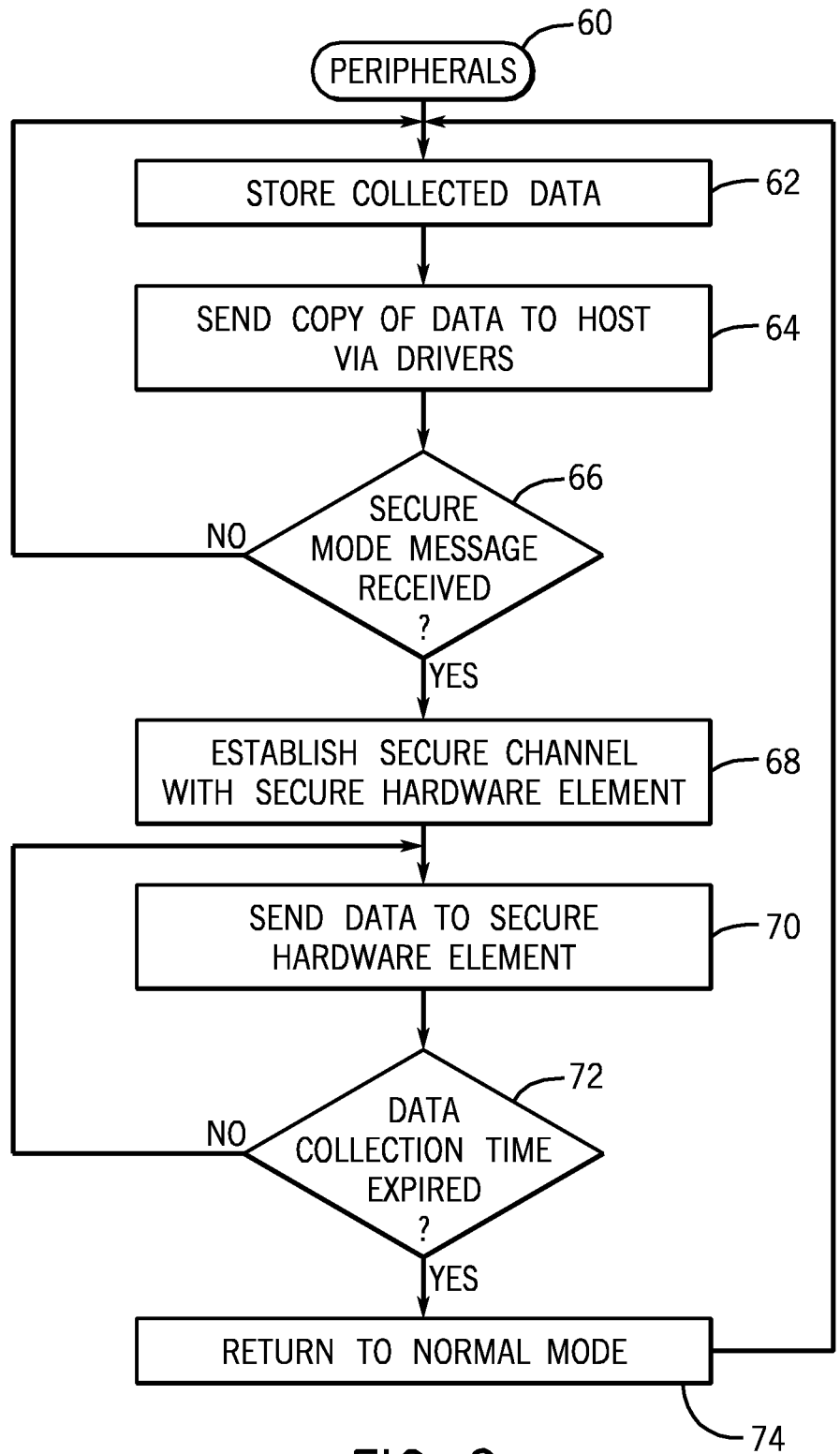
FIG. 2 is a flowchart for peripherals in accordance with one embodiment to the present invention.

Thus referring to FIG. 2, a peripheral sequence 60 may be implemented in software, firmware, and/or hardware. In software and firmware embodiments it may be implemented by computer executed instructions stored in a non-transitory computer readable medium such as a magnetic, optical or semiconductor storage. In some cases, the sequence may be implemented onboard each peripheral itself using an onboard controller and storage.

The sequence 60, shown in FIG. 2 begins by storing collected data in normal mode as indicated in block 62. Each peripheral sends a copy of the data to the host software 12 via one of the drivers 24 through 30 as indicated in block 64.

A check at diamond 66 determines whether a secure mode message has been received. The secure mode message may be sent in response to determining that a particular event has occurred that triggers electronic data recording. If such a message has been received, as determined in diamond 66, a secure channel is established (block 68) with a secure hardware element 14. The secure channel is indicated by the words "secure channel" in FIG. 1. Next the peripheral sends the data to the secure hardware element over the secured channel as indicated in block 70. The first "chunk" of data that is sent to the secure element is the data from the memory buffer, i.e. data leading to the "event" and additional data is collected after the event until the timer expires in one embodiment.

Thereafter a check at diamond 72 determines whether a predefined data collection time has expired for that peripheral device. The data collection time may be a function of the amount of data that is needed and may be different for every peripheral device. If not, the data continues to be collected and sent as indicated by the no prong from the diamond 72. Otherwise, if the collection time has expired, then that peripheral returns to only the normal mode as indicated in block 74.

Figure 3:
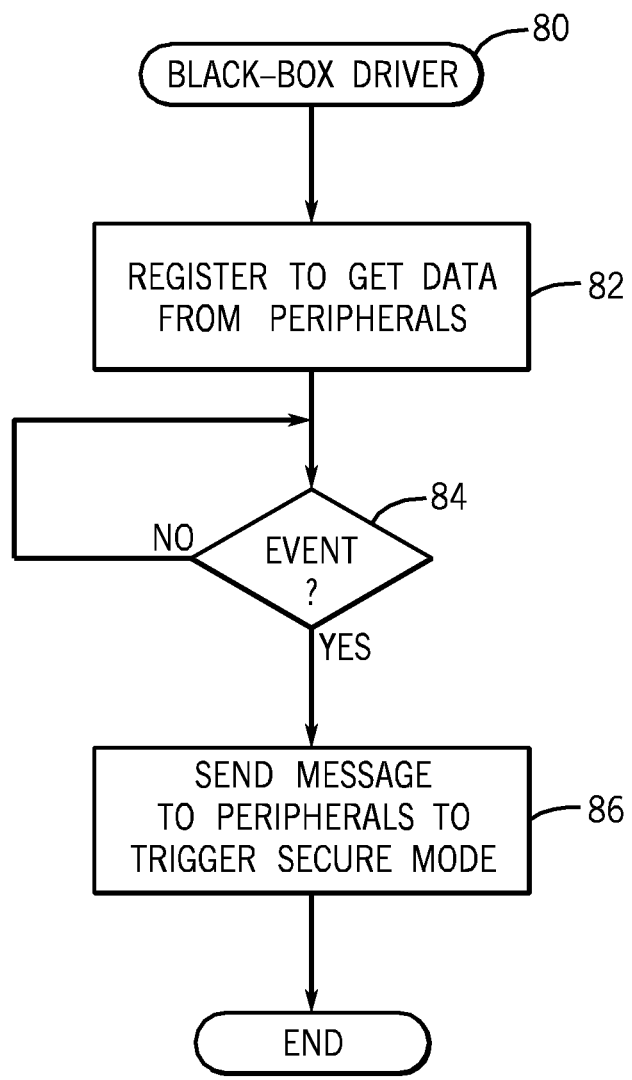
FIG. 3 is a flowchart for a black box driver in accordance with one embodiment of the present invention.

Moving to FIG. 3, a sequence 80 for the black box driver 22 (shown in FIG. 1) is shown in FIG. 3. The sequence 80 may be implemented in software, firmware and/or hardware. In software and firmware embodiments it may be implemented by computer executed instructions stored in a non-transitory computer readable medium such as an optical, magnetic or semiconductor storage. The black box driver may be stored within the platform 10 in a suitable memory or as part of its processing device in some embodiments.

The sequence 80 begins with the black box driver registering with each of the plurality of peripherals in order to get data from those peripherals under particular circumstances, as indicated in block 82. Upon the occurrence of a preordained event, detected in diamond 84, the black box driver sends a message to each of the peripherals to trigger those peripherals to enter the secure mode that correlates to the event data recording, as indicated in block 86. It is contemplated that in response to some of events only certain peripherals may be triggered to enter the secure mode while other peripherals do not enter the secure mode.

Instead of using the black box driver 22, a hardware element or sensor such as alarm 44 may turn on and off the secure mode.

Figure 4:
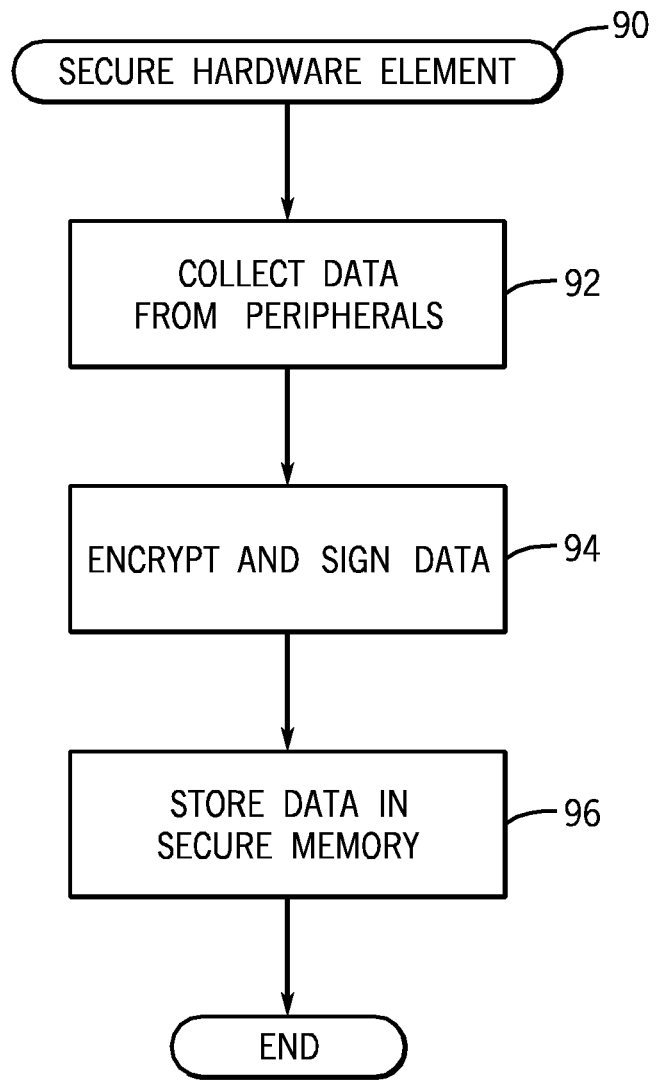
FIG. 4 is a flowchart for a secure hardware element according to one embodiment to the present invention.

The secure hardware element 14 sequence 90, shown in FIG. 4, may be implemented in hardware, software and/or firmware 14 (FIG. 1). In software and firmware embodiments it may be implemented by computer executed instructions stored in a non-transitory computer readable medium such as an optical, magnetic or semiconductor storage. In some embodiments a hardware implemented sequence 90 may be advantageous as it is less prone to software based attacks.

The sequence 90 begins by collecting data from the peripherals which are collecting the data in the secure mode as indicated in block 92. As the data is received, it is encrypted and signed as indicated in block 94. Finally the encrypted and signed data is stored in a secure memory associated with the hardware element 14 as indicated in block 96. Thereafter, the data may be extracted using the appropriate access privileges. The extracted data is event data to implement an event data recording application.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   detecting a triggering event;
   in response to the triggering event, recording event data from a sensor in a secure mode over a secure channel using a computer processor;
   using a hardware device to control event data recording; and
   enabling said hardware device to send a message to peripheral device to trigger the secure mode.

2. The method of claim 1 including continuing to process sensor data in parallel over a non-secure channel during the secure mode.

3. The method of claim 1 including implementing an open system.

4. The method of claim 1 including separately switching one of a plurality of peripherals to a secure mode.

5. The method of claim 1 including using one controller to run said event data recording and another controller to run applications other than event data recorder applications.

6. The method of claim 1 including causing said peripheral device to send data to said hardware device in a secure mode in response to said message.

7. The method of claim 1 further including in response to detecting a triggering event, collecting data for a period before the event from a buffer.

8. The method of claim 7 including collecting data before and after the event.

9. A non-transitory computer readable medium storing instructions to:

detect a triggering event;

in response to the triggering event, collect event data from a sensor in a secure mode over a secure channel using a computer processor;

use a hardware device to control even data recording; and enable said hardware device to send a message to peripheral device to trigger the secure mode.

10. The medium of claim 9 further storing instructions to continue to process sensor data in parallel over a non-secure channel during the secure mode.

11. The medium of claim 9 further storing instructions to implement an open system.

12. The medium of claim 9 further storing instructions to separately switch one of a plurality of peripherals to a secure mode.

13. The medium of claim 9 further storing instructions to use one controller to run said event data recording and another controller to run applications other than event data recorder applications.

14. The medium of claim 9 further storing instructions to cause said peripheral device to send data to said hardware device in a secure mode in response to said message.

15. The medium of claim 9 further storing instructions in response to detecting a triggering event, collect data for a period before the event from a buffer.

16. The medium of claim 15 further storing instructions to collect data before and after the event.

17. An apparatus comprising:

a computer processor to detect a triggering event, in response to the triggering event, record event data from a sensor in a secure mode over a secure channel using said computer processor, use a hardware device to control event data recording, and send a message to peripheral device to trigger the secure mode; and a storage, coupled to said processor, to store said data.

18. The apparatus of claim 17, said processor to process sensor data in parallel over a non-secure channel during the secure mode.

19. The apparatus of claim 17, said processor to implement an open system.

20. The apparatus of claim 17, said processor to separately switch one of a plurality of peripherals to a secure mode.

21. The apparatus of claim 17 including a controller to run said event data recording and another controller to run applications other than event data recorder applications.

22. The apparatus of claim 17, said processor to cause said peripheral device to send data to said hardware device in a secure mode in response to said message.

23. The apparatus of claim 17, said processor to collect data for a period before the event from a buffer.

24. The apparatus of claim 23, said processor to collect data before and after the event.

* * * * *